United States Patent [19]

Schäfer et al.

[11] 4,003,723
[45] Jan. 18, 1977

[54] PURIFICATION OF CRUDE HYDROGEN CHLORIDE

[75] Inventors: Stefan Schäfer, Bruhl; Alexander Ohorodnik, Erftstadt-Liblar; Klaus Gehrmann, Erftstadt-Lechenich; Albert Mainski, Rodenkirchen, all of Germany

[73] Assignee: Hoechst Aktiengesellschaft, Frankfurt am Main, Germany

[22] Filed: May 17, 1976

[21] Appl. No.: 686,928

[30] Foreign Application Priority Data

May 20, 1975 Germany .............. 2522286

[52] U.S. Cl. .............. 55/71; 260/539 A; 423/240; 423/488
[51] Int. Cl.² ...................... B01D 19/00
[58] Field of Search .............. 55/71; 423/240, 488; 260/539 A

[56] References Cited
UNITED STATES PATENTS 2,558,011  6/1951  Sprauer et al. ............ 423/488

FOREIGN PATENTS OR APPLICATIONS 928,179  6/1963  United Kingdom .......... 55/71

*Primary Examiner*—Bernard Nozick
*Attorney, Agent, or Firm*—Connolly and Hutz

[57] ABSTRACT

Crude hydrogen chloride gas obtained as a by-product in the production of chloroacetic acids by the catalytic chlorination of acetic acid with chlorine gas in contact with acetic anhydride and/or acetyl chloride, and contaminated with about 0.6 up to 3 % by volume of acetyl chloride is purified. To this end, crude hydrogen chloride gas is introduced into the base portion of a scrubbing zone and scrubbed countercurrently therein with 0.5 up to 20 liter, per normal cubic meter (S.T.P) of hydrogen chloride gas, of a cooled scrubbing liquid under circulation, consisting substantially of 20–80 weight % of concentrated $H_2SO_4$, 15–60 weight % of acetic acid, and 5–50 weight % of water. The resulting purified moist hydrogen chloride gas issuing at the head of the scrubbing zone is introduced into the base portion of a drying zone and scrubbed countercurrently with precooled sulfuric acid under circulation.

11 Claims, 1 Drawing Figure

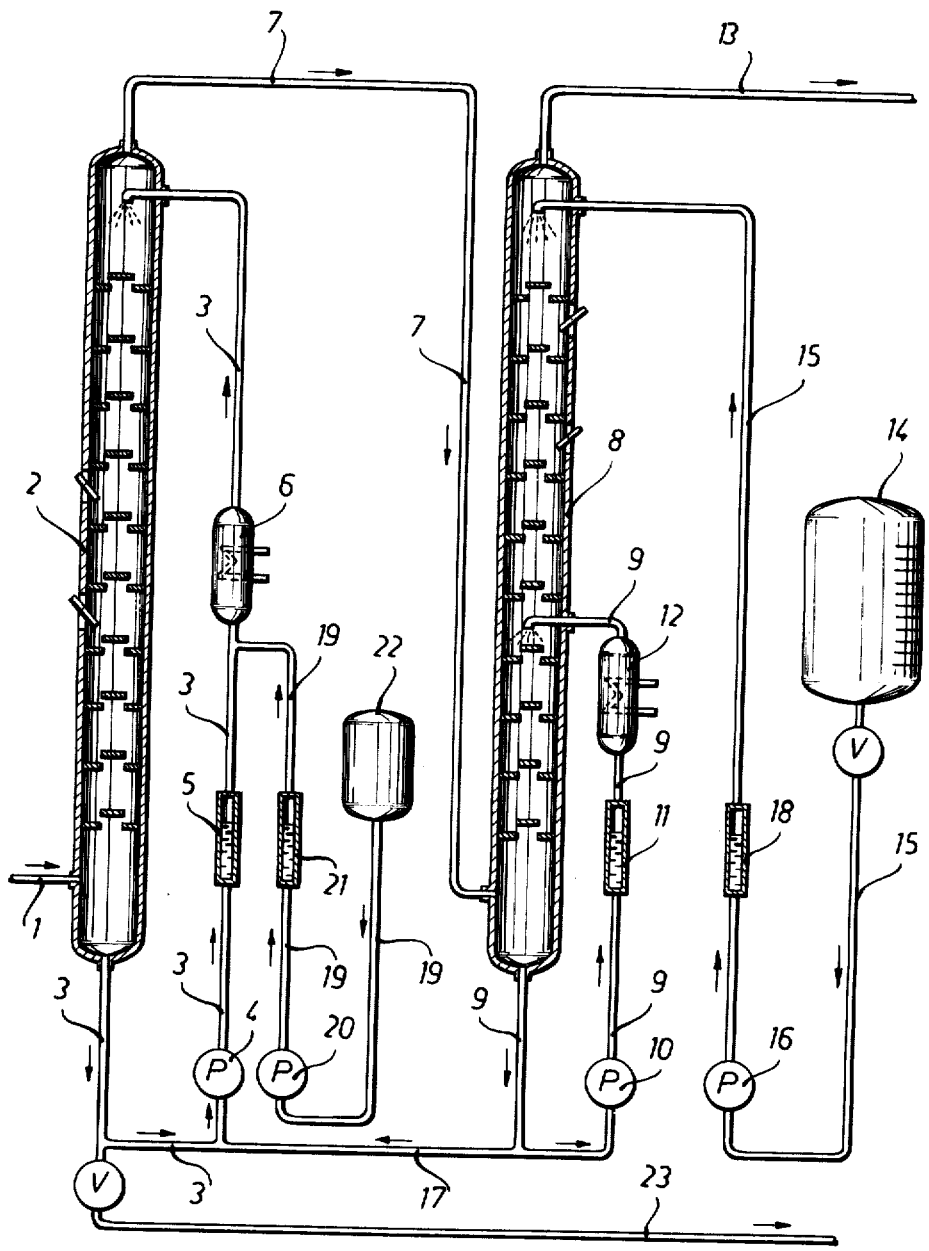

PURIFICATION OF CRUDE HYDROGEN CHLORIDE

The present invention relates to the purification of crude hydrogen chloride gas, such as that obtained as a by-product in the continuous production of chloroacetic acids by the catalytic chlorination of acetic acid with chlorine gas in contact with acetic anhydride and/or acetyl chloride.

It has been described (cf. Ullmann's Encyklopadie der technischen Chemie, 3rd edition, vol. 5, pages 390–391) that chloroacetic acids can be made continuously by subjecting acetic acid of at least 98% strength to chlorination with chlorine at a temperature of at least 85° C while adding acetic anhydride and/or acetyl chloride as a catalyst. In order to enable the hydrogen chloride by-product obtained in this reaction to be utilized, it is necessary for it to be freed from condensable constituents which are interesting reaction accelerators and should conveniently be recycled to the acetic acid-chlorination stage. To this end, the issuing gas is scrubbed countercurrently with fresh product and/or freed from condensable constituents by intense cooling.

A similar process for making chloroacetic acids has been described in German published Specification Offenlegungsschrift No. 1 919 476, wherein acetyl chloride and optionally further gaseous products issuing from the reactor are recovered. To achieve this, the gas issuing from the reactor is cooled down to a temperature of at least about 20° C and additionally scrubbed countercurrently with the mixture which is to undergo chlorination and consists of acetic acid, acetic anhydride and/or acetyl chloride.

The hydrogen chloride gas so purified still contains 0.6 up to 3% by volume of carboxylic acid chlorides, predominantly acetyl chloride together with a minor proportion of chloroacetyl chloride. Experience has shown such contaminated hydrogen chloride gas to be extremely corrosive, especially in those cases in which the gas is compressed to effect the condensation of its condensable constituents. This is the reason why it has not been possible heretofore to treat hydrogen chloride gas in conventional devices and purify it to the extent necessary to obtain hydrogen chloride gas suitable for use in further reactions. All processes described heretofore are limited to the absorption of crude hydrogen chloride gas in water or hydrochloric acid with the resultant formation of a hydrochloric acid/acetic acid-mixture, which is difficult to separate distillatively and can incidentally not be separated under economically attractive conditions, because of the minor difference between the boiling point of acetic acid and that of the hydrogen chloride/water-azeotrope. In other words, it has often been necessary to discard hydrochloric acid so contaminated with acetic acid.

The present invention now provides an economic process for the purification of crude hydrogen chloride gas, such as that obtained in the production of chloroacetic acids by chlorinating acetic acid with chlorine gas at elevated temperature and in contact with an acetic anhydride and/or acetyl chloride catalyst, the resulting purified hydrogen chloride gas containing less than 10 ppm of water and less than 200 ppm of acetic acid. Hydrogen chloride gas having such purity is suitable for use, for example, in oxychlorination reactions.

The present process for the purification of a crude hydrogen chloride gas by-product, which is obtained in the production of chloroacetic acids by the catalytic chlorination of acetic acid with chlorine gas in contact with acetic anhydride and/or acetyl chloride, and continues to be contaminated, even after having been prepurified, with about 0.6 up to 3 % by volume of acetyl chloride and optionally with some minor proportion of chloroacetyl chloride, comprises more particularly: introducing the crude hydrogen chloride gas into the base portion of a scrubbing zone and scrubbing it countercurrently therein with about 0.5 up to 20 liter, per normal cubic meter (S.T.P.) of hydrogen chloride gas, of a cooled scrubbing liquid kept under circulation and consisting substantially of about 20 up to 80 weight % of concentrated $H_2SO_4$, about 15 up to 60 weight % of acetic acid, and about 5 up to 50 weight % of water; introducing the resulting purified moist hydrogen chloride gas issuing at the head of the scrubbing zone into the base portion of a drying zone and drying it therein by scrubbing it countercurrently with precooled sulfuric acid kept under circulation, the sulfuric acid being used at a rate of about 0.5 up to 20 liter, per normal cubic meter of hydrogen chloride; and removing dry hydrogen chloride near the head of the drying zone.

A preferred feature of the present process comprises scrubbing the crude hydrogen chloride gas with 3 up to 10 liter of scrubbing liquid per normal cubic meter of gas, the scrubbing liquid being a mixture of 30–60 weight % of concentrated $H_2SO_4$, 20–50 weight % of acetic acid, and 10–40 weight % of water.

To dissipate the reaction heat, which is set free during the scrubbing step and originates inter alia from the saponification of the acetyl chloride with the resultant formation of acetic acid, the scrubbing liquid should conveniently be circulated and cooled, before it enters the scrubbing zone, to the extent necessary for it to have a temperature of about 10°–30° C, preferably 15° to 25° C, in the upper portion of the scrubbing zone.

A further advantageous embodiment of the present process provides for the concentrated sulfuric acid kept under circulation in the drying zone to be cooled, before it enters the drying zone, to the extent necessary for it to have a temperature of about 10°–35° C, preferably 15°–30° C, in the base portion of the drying zone, about 3–10 l of sulfuric acid per normal cubic meter of hydrogen chloride being preferably kept under circulation.

The process of the present invention may be effected batchwise or continuously. If carried out continuously, about 10–100 ml, preferably 25–50 ml. of concentrated sulfuric acid, per normal cubic meter of hydrogen chloride, should conveniently be introduced continuously into the upper portion of the drying zone, and an adequate proportion of circulated sulfuric acid should simultaneously be removed from the base portion of the drying zone. The sulfuric acid so removed should be diluted with water in a ratio by volume of 1:1 and used for partial replacement of the scrubbing liquid under circulation in the scrubbing zone. The temperature in the upper portion of the drying column should preferably be at about 15°–40° C, more preferably at 20°–35° C.

Upon the partial replacement of the scrubbing liquid kept circulating in the scrubbing zone, it is necessary for an adequate proportion (adequate with respect to the quantity of sulfuric acid supplied) of acetic acid contaminated with scrubbing liquid to be removed from the cycle. This is contaminated acid which may be delivered to an acetic acid recovery stage.

The drawing is the embodiment of the purification of crude hydrogen chloride.

An exemplary embodiment of the present invention will now be described with reference to the accompanying flow scheme. Needless to say the invention is in no way limited to the embodiment described.

Crude hydrogen chloride gas, which is to undergo purification in accordance with the present invention, is introduced through a conduit 1 into the base portion of a scrubbing column 2 and scrubbed countercurrently therein with a scrubbing liquid delivered to the head of the scrubbing column 2 and consisting, e.g. of 30–60 weight % of $H_2SO_4$, 20–50 weight % of acetic acid and 10–40 weight % of water. The scrubbing column 2 may comprise, e.g. a bubble tray or packed column, with an efficiency corresponding to the separating power of 10 to 15 theoretical trays. Scrubbing liquid coming from the base portion of the scrubbing column 2 is recycled to the head of the column 2 by means of a pump 4 and through a conduit 3. The quantity of scrubbing liquid under circulation is metered by means of a quantity recording meter 5. Also disposed in the conduit 3 is a heat exchanger 6 enabling the reaction heat set free during scrubbing to be dissipated. Hydrogen chloride freed from carboxylic acid chlorides is taken from the head of the scrubbing column 2 through a conduit 7 and delivered to the base portion of a drying column 8 which may equally comprise a bubble tray column with a separating power corresponding to that of at least 10–15 theoretical trays. Gas which ascends in the drying column 8 is scrubbed countercurrently with concentrated sulfuric acid and dried in this manner. Sulfuric acid which accumulates in the base portion of the drying column 8 is continuously taken therefrom and recycled to the drying column through a conduit 9. Disposed in the conduit 9 are a pump 10, a quantity recording meter 11, and a heat exchanger 12 for delivering, metering and cooling the sulfuric acid. Purified dry hydrogen chloride gas leaves the drying column 8 through a conduit 13.

The sulfuric acid under circulation in the drying column 8 is continuously replaced by a metered quantity (metered by means of a quantity recording meter 18) or fresh sulfuric acid coming from a reservoir 14 and conveyed through a conduit 15 by means of a pump 16. At the same time, an adequate proportion of circulated sulfuric acid is taken from the base portion of the drying column 8 through the conduit 9, and recycled to the scrubbing column 2 through the conduit 3. The sulfuric acid fed to the cycle line 3 through the conduits 9 and 17 is diluted with a metered quantity (metered by means of a quantity recording meter 21) of water. The water comes from a reservoir 9, travels through a conduit 19 and is pumped into the cycle line 3 by means of the pump 20.

The volume of liquid conveyed through the cycle line 3 and kept under circulation in the scrubbing column 2 is maintained constant. To this end, the invention provides for fresh sulfuric acid and water to be introduced continuously into the cycle line 3, and for an adequate proportion of scrubbing liquid to be removed simultaneously from the base portion of the scrubbing column 2 through the conduits 3 and 23.

The process of the present invention enables the crude hydrogen chloride gas by-product, which is invariably obtained in the production of chloroacetic acids by the chlorination of acetic acid with chlorine gas at elevated temperature and in contact with an acetic anhydride and/or acetyl chloride catalyst, to be purified under commercially attractive conditions and compares very favorably in this respect with the prior art methods. The resulting purified hydrogen chloride gas contains very minor residual proportions of water and acetic acid, i.e. less than 10 ppm of water and less than 200 ppm of acetic acid, so that it is possible for it to be used, e.g. as a reactant in oxychlorination reactions. The composition of the scrubbing liquid is a factor which critically determines successful operation. More particularly, the scrubbing liquid should be so composed that it is possible for the carboxylic acid chlorides, which are contained in crude hydrogen chloride gas, to be dissolved in the scrubbing liquid. In this connection, it is interesting to state that carboxylic acid chlorides contained in crude hydrogen chloride are insufficiently soluble only in concentrated sulfuric acid. In other words, concentrated sulfuric acid cannot be used alone as the scrubbing liquid.

EXAMPLE

As shown in the accompanying flow scheme, the scrubbing column 2 was supplied through the conduit 1 with 6.5 normal cubic meter of prepurified crude hydrogen chloride gas, which was obtained in the chlorination of acetic acid with chlorine gas in contact with acetic anhydride and acetyl chloride catalysts. The crude hydrogen chloride gas contained 0.6 up to 3 % by volume of acetyl chloride. The scrubbing column 2 was a bubble tray column which had a diameter of 100 mm and was provided with 10 trays. Pump 4 was used to circulate 28–30 l/h of scrubbing liquid, which had the following composition after an operation period of 48 hours of the scrubbing column 2:

40 weight % of concentrated sulfuric acid,
40 weight % of acetic acid, and
20 weight % of water.

The liquid under circulation was cooled in heat exchanger 6 and a temperature of 21°–23° C was found to establish in the middle portion of the scrubbing column 2. Moist hydrogen chloride was taken from the head of the scrubbing column 2. It was introduced through the conduit 7 into the drying column 8 which was a bubble tray column with a diameter of 100 mm and 10 trays. To dry the hydrogen chloride, 30 l/h of concentrated sulfuric acid was circulated in the drying column 8 and in the conduit 9. The sulfuric acid was prevented from extracting water from the hydrogen chloride and from becoming increasingly diluted therewith. To this end, 200 ml of concentrated $H_2SO_4$ was continuously fed to the head of the drying column 8 and an adequate proportion of sulfuric acid under circulation was simultaneously removed from the cycle. The sulfuric acid under circulation was cooled in heat exchanger 12 so that a temperature of 23°–26° C was established in the cycle. In the upper portion of the drying column 8, the temperature was at most 26°–28° C. Hydrogen chloride gas containing less than 10 ppm of water and less than 200 ppm of acetic acid was removed near the head of the drying column. The sulfuric acid (200 ml) taken from the cycle in the drying column was combined with the scrubbing liquid under circulation and diluted with 200 ml of water. The volume of scrubbing liquid was kept constant by the continuous removal of 400 ml of scrubbing liquid from the scrubbing liquid cycle.

We claim:

1. A process for the purification of a crude hydrogen chloride gas by-product, which is obtained in the production of chloroacetic acids by the catalytic chlorination of acetic acid with chlorine gas in contact with acetic anhydride and/or acetyl chloride, and continues to be contaminated, even after having been prepurified, with about 0.6 up to 3 % by volume of acetyl chloride and optionally with some minor proportion of chloroacetyl chloride, which comprises: introducing the crude hydrogen chloride gas into the base portion of a scrubbing zone and scrubbing it countercurrently therein with about 0.5 up to 20 liter, per normal cubic meter (S.T.P.) of hydrogen chloride gas, of a cooled scrubbing liquid under circulation and consisting substantially of about 20 up to 80 weight % of concentrated $H_2SO_4$, about 15 up to 60 weight % of acetic acid, and about 5 up to 50 weight % of water; introducing the resulting purified moist hydrogen chloride gas issuing at the head of the scrubbing zone into the base portion of a drying zone and drying it therein by scrubbing it countercurrently with precooled sulfuric acid under circulation, the sulfuric acid being used at a rate of about 0.5 up to 20 liter, per normal cubic meter of hydrogen chloride; and removing dry hydrogen chloride near the head of the drying zone.

2. The process as claimed in claim 1, wherein the scrubbing liquid comprises a mixture consisting of 30–60 weight % of concentrated sulfuric acid, 20–50 weight % of acetic acid, and 10–40 weight % of water.

3. The process as claimed in claim 1, wherein the crude hydrogen chloride gas is scrubbed with 3–10 liter of scrubbing liquid, per normal cubic meter of gas.

4. The process as claimed in claim 1, wherein the concentrated sulfuric acid under circulation is cooled, prior to entering the drying zone, to the extent necessary to have a temperature of about 10°–35° C, in the base portion of the drying zone.

5. The process as claimed in claim 1, wherein 3–10 liter/hour of sulfuric acid is circulated, per normal cubic meter of hydrogen chloride.

6. The process as claimed in claim 1, wherein the scrubbing liquid under circulation is cooled, prior to entering the scrubbing zone, to the extent necessary to have a temperature of about 10°–30° C in the upper portion of the scrubbing zone.

7. The process as claimed in claim 6, wherein a temperature of 15°–25° C is established in the upper portion of the scrubbing zone.

8. The process as claimed in claim 1, wherein about 10–100 ml of concentrated sulfuric acid, per normal cubic meter of hydrogen chloride, is introduced continuously into the upper portion of the drying zone and an adequate proportion of sulfuric acid under circulation is simultaneously taken from the base portion of the drying zone, the sulfuric acid is diluted with water in a ratio by volume of about 1:1 and used for partial replacement of the scrubbing liquid under circulation in the scrubbing zone.

9. The process as claimed in claim 8, wherein the upper portion of the drying zone is continuously supplied with 25–50 ml of concentrated sulfuric acid, per normal cubic meter of hydrogen chloride.

10. The process as claimed in claim 8, wherein a temperature of about 15°–40° C, is established in the upper portion of the drying zone.

11. The process as claimed in claim 8, wherein the scrubbing liquid under circulation in the scrubbing zone is partially replaced, an adequate proportion (adequate with respect to the quantity of sulfuric acid supplied) of acetic acid contaminated with scrubbing liquid is removed from the cycle and delivered to an acetic acid recovery stage.

* * * * *